United States Patent

[11] 3,589,300

| | | | | |
|---|---|---|---|---|
| [72] | Inventor | Stefan L. Wipf Canoga Park, Calif. | | |
| [21] | Appl. No. | 770,695 | | |
| [22] | Filed | Oct. 25, 1968 | | |
| [45] | Patented | June 29, 1971 | | |
| [73] | Assignee | North American Rockwell Corporation | | |

[54] MAGNETIC SUSPENSION SYSTEM
11 Claims, 10 Drawing Figs.

[52] U.S. Cl. .......................................... 104/148 MS, 310/13, 335/216
[51] Int. Cl. .......................................... B01l 13/08, H01f 7/00, H02k 41/00
[50] Field of Search.................................. 335/216, 104/148 MS, 148 LM; 310/12, 13; 335/224, 5, 6, 310, 166, 308, 10, 220, 209

[56] References Cited
UNITED STATES PATENTS

| | | | |
|---|---|---|---|
| 2,993,130 | 7/1961 | Laithwaite...................... | 310/13 |
| 3,125,964 | 3/1964 | Silverman...................... | 104/148 X (MS) |
| 3,233,559 | 2/1966 | Smith et al.................... | 104/148 (UX) (LM) |
| 3,470,828 | 10/1969 | Powell, Jr. et al............. | 104/148 (MS) |

*Primary Examiner*—Arthur L. La Point
*Assistant Examiner*—George H. Libman
*Attorneys*—H. Fredrick Hamann, L. Lee Humphries, Thomas S. MacDonald and Robert M. Davidson

ABSTRACT: An improved magnetic suspension system suitable for vehicles wherein a propelled magnet is both levitated and guided by repulsion from eddy currents that are induced in a nonferromagnetic and continuous conductor.

INVENTOR.
STEFAN L. WIPF

INVENTOR.
STEFAN L. WIPF

MAGNETIC SUSPENSION SYSTEM

BACKGROUND OF THE INVENTION

Magnetic suspension of weight is based on the attraction or repulsion between sets of current-carrying wires, or on the attraction or repulsion of ferromagnetic materials to magnets.

Ferromagnetic objects can be suspended by a magnetic field but unfortunately not stably, except in very specialized cases. A servo system is needed to automatically control the magnetic field so that the field is decreased as the object approaches a suspending magnet and increased as it recedes.

Objects can be stably suspended by diamagnetic repulsion without the use of a servo system. This method is based on the mutual repulsion of a magnetic field and induced currents in a conductive body. The conductive body may be either superconducting or a normal conductor.

Superconductive suspension has usually been based on the diamagnetic characteristics of Type I superconductors, such as lead. Magnetic flux cannot penetrate into such a superconductor since surface currents are set up which generate a magnetic filed that exactly opposes any external field. Consequently, the superconductor experiences a force which tends to move it out of any applied field. This repulsion of flux has been used to support bearings, rotating shifts, gyroscopes, and accelerometers.

Nonsuperconductive suspension depends on the application of time-varying magnetic fields. Such time-varying fields induce currents which are opposite in direction to the currents that generate the field. Consequently, a conducting object tends to move out of a time-varying magnetic field. The time-varying field can be time varying by virtue of its movement in space. This is the basis of the suspension system presented by Powell and Danby. (J. R. Powell and G. R. Danby, "High Speed Transport by Magnetically Suspended Trains," *ASME* Winter Annual Meeting, New York, Railroad Div. 66–WA/RR5, Nov. 1966.

Powell and Danby considered a train moving at 100 to 300 miles per hour supported by a superconductor magnet carried by the train which moves over loops or short circuited conductors which correspond to rails of an ordinary train. Currents are induced in the ground loops in such a direction as to oppose and lift the superconducting magnet. The track currents are induced, in small sections at a time, by the current loops on the moving vehicle. This eliminates the need for external track current power supplies; track currents flow only when necessary, and the energy in a given track loop is largely retrieved as the train passes across the stationary track loops. Powell and Danby have also proposed that the magnet carried in the train be superconductive. This saves weight and power, and makes the system practical. Such schemes are now possible due to the advent of high field superconductors in the last few years.

High field magnets use Type II superconductors, such as niobium-tin, which operate in the superconducting state for fields far greater than the lower critical field of Type I superconductors. Flux is not expelled, and the magnets behave much like ordinary magnets except for different loss mechanisms.

The present state of the art indicates that magnetic suspension does work; however, there is need for a more economical magnetic suspension system.

OBJECTS OF THE INVENTION

Accordingly, it is an object of the invention to provide a new and improved magnetic suspension system.

It is an object of the invention to provide an improved magnetic suspension system for moving vehicles.

It is an object of the invention to provide an improved magnetic suspension system for moving vehicles that is self-stabilizing during operation.

It is an object of the invention to provide an improved magnetic system for moving vehicles that has a simplified, and thereby less costly, conducting surface.

It is an object of the invention to provide an improved magnetic suspension system that is highly reliable at a relatively low cost.

SUMMARY OF THE INVENTION N

Briefly, in accordance with one form of the invention, an improved magnetic suspension system is provided having a magnet that is propelled along a continuous and nonferromagnetic conductor. The moving magnet induces eddy currents in the conductor that oppose any change in the magnetic field and results in a force of repulsion that levitates the moving magnet at a predetermined velocity $v$. At the predetermined velocity $v$, the induced currents opposite the magnet have no time to decay and the magnet is in effect repelled by its mirror image. The force of repulsion also maintains the moving magnet in equilibrium as it is propelled along the conductor since the magnet experiences an increased restoring force whenever the magnet moves toward the adjacent conductor. The system is, therefore, lifted and stabilized by the developed force of repulsion.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawings.

DESCRIPTION OF THE INVENTION

A hovering magnet over a superconducting surface has been described (V. Arkadiev, *J. Phys. USSR* 9, 148, 1945 and *Nature*, Lond. 160, 330, 1948.) Because of the Meissner effect, the hovering magnet induces currents in the superconducting surface which completely shield the interior from any magnetic field. These induced currents produce a magnetic field above the surface—like the same magnet would if it were in the position of its mirror image—and repel the original magnet.

Figure 1:
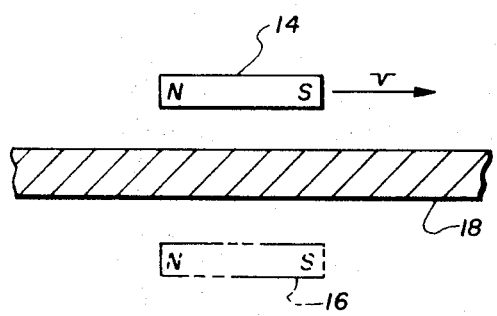
FIG. 1 is a schematic view, partly broken away, showing the principle of the invention.

A similar situation exists if the surface is nonferromagnetic, a normal conductor such as an aluminum or copper sheet, but is moving relative to the magnet at a velocity of $v$. Thus in FIG. 1, a magnet means such as magnet 14 is repelled by its mirror image 16 (shown in phantom) when a continuous, nonferromagnetic conductor means such as surface 18 moves at a velocity $v$ relative to the magnet. Obviously, the magnet 14 could move at a velocity $v$ relative to the surface 18. It is also contemplated that both magnet and the surface can be moving in different directions so that a resulting velocity $v$ is developed. The magnet means can be superconducting, electromagnets, or permanent magnets; however, the condition $l/v \ll L/R$, i.e., $l/v$ is significantly less than $L/R$, must be fulfilled, where $l$ is the length of the magnet 14, $L$ the inductance of the path of the induced currents and $R$ the resistance. When this condition is fulfilled, the induced currents opposite the magnet have no time to decay and the magnet will be repelled by its mirror image 16 as if the surface 18 were superconducting.

Figure 2:
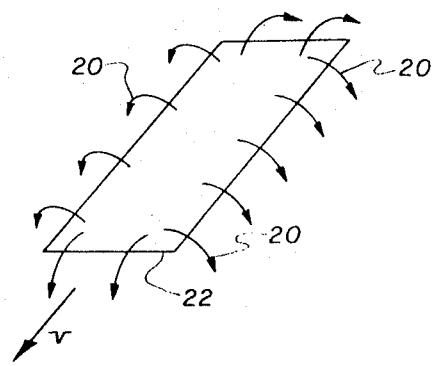
FIG. 2 is a schematic view of one form of magnet means of the invention.
Figure 3:
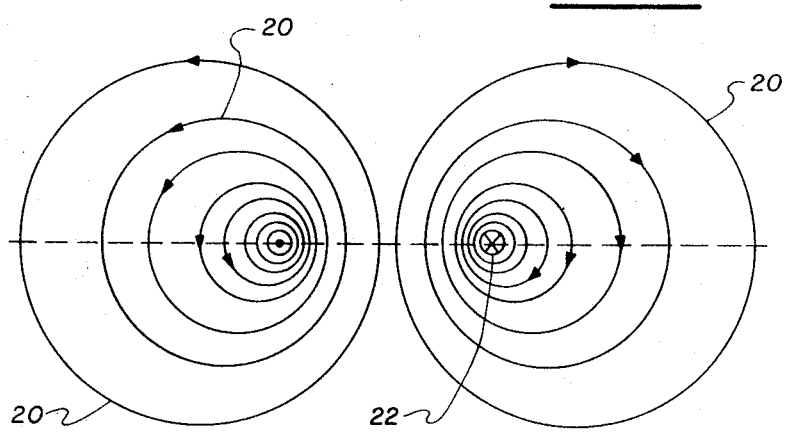
FIG. 3 is a schematic view of the magnetic flux lines set up by the energized magnet means of FIG. 2 in free space.

FIGS. 2 and 3 show the magnetic flux lines 20 set up around an energized current loop 22 in free space with the current flow into the plane of the drawing indicated by the ⊗ and the current flow out of the plane of the drawing indicated by the ⊙.

Figure 4:
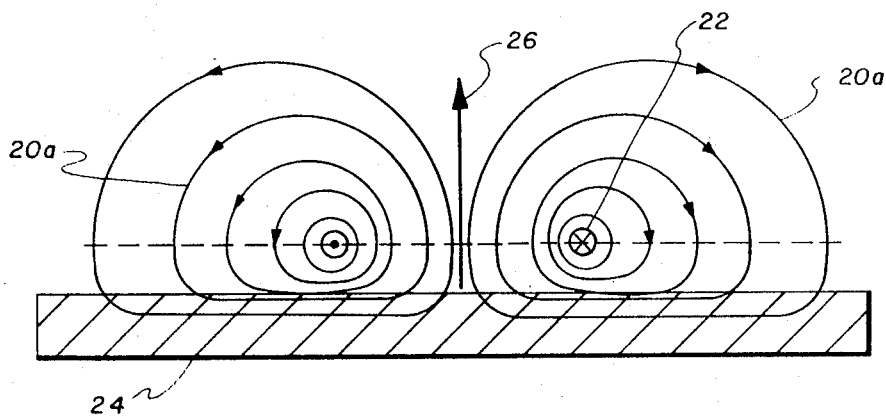
FIG. 4 is a schematic view of the magnetic flux lines set up by the energized magnet means of FIG. 2 as the magnet means moves over a continuous conductor means oriented perpendicular to the plane of the drawing.

FIG. 4 shows the magnetic flux lines 20a as the current loop 22 moves at a velocity $v$ over a continuous, nonferromagnetic conductor means, such as continuous sheet conductor 24 which can be a continuous sheet of aluminum or copper.

According to Lenz's law, induced currents will at every instant flow in a conductor such as a conductor 24 in such a direction as to oppose any change in the applied magnetic flux. The force, $\overline{F} = \overline{I} \times \overline{B}$, between the induced current $I$ and the local field $B$ will then become a force of repulsion represented by the arrow 26. If $\overline{F}$ is to be large, the conductor 24 must be situated so that suitable eddy current paths are available. Such levitation is similar to the levitation of conductors in alternating magnetic fields. Practical use of this principle is made by suspending globules of molten metal inside an inductance furnace without contaminating wall contact. (P. J. Geary, "Magnetic and Electric Suspensions," *British Scientific Instrument Research Association Report* R 314, Taylor and Francis, London 1964.

An alternative viewpoint is to consider the conductor 24 to be, in a high velocity limit, the boundary of a region of zero magnetic permeability. The magnetic flux from the coil or current loop 22 is then compressed by the conductor 24 and becomes further compressed if the magnet, i.e., energized current loop 22, approached the conductor 24. Thus the magnet experiences a restoring force away from the conductor.

The maximum lift force $\overline{F}$ represented by arrows 26 at velocity $v$ can be calculated by the image method. An equivalent flux distribution would be obtained if an image coil moving in the same direction (see magnet 16 as shown in phantom by FIG. 1) were symmetrically placed underneath the sheet conductor 24. The image current would be in an opposite direction to that in the real coil 22. The force of repulsion $\overline{F}$ between the loop 22 and the conductor sheet 24 is the same as between two opposing loops separated by twice the distance of coil to conductor sheet. Power is of course dissipated in the conductor sheet and this results in a drag or eddy current brake on the movement of the coil 22, and thus on any vehicle cooperating therewith.

Figure 5:
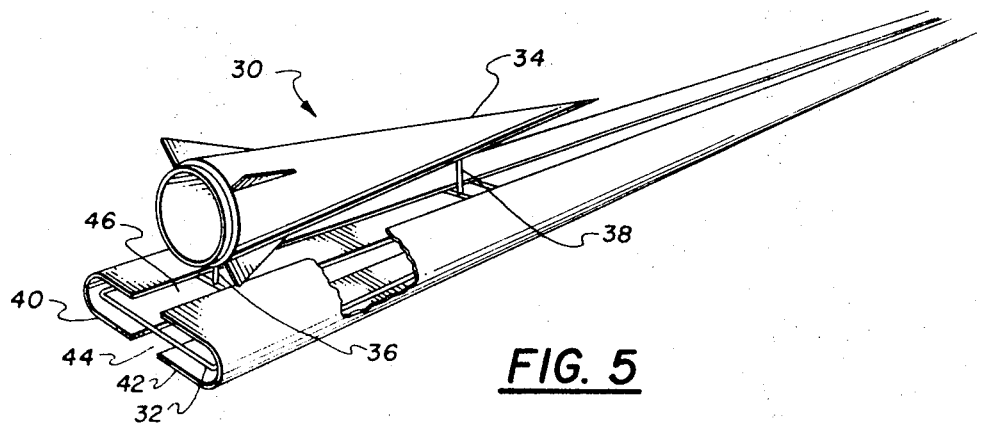
FIG. 5 is a perspective view of one form of vehicle wherein the improved magnetic suspension system of the invention finds use.

Referring to FIG. 5, a vehicle platform 30 that utilizes the improved magnetic suspension system of the invention includes a superconducting magnet coil 32 which is functionally similar to the previously described coil 22 as shown by FIGS. 2 through 4, a vehicle 34 which can be a rocket as shown, and suitable structural mounts 36 and 38 which connect the coil 32 and the vehicle 34. Longitudinally extending, channel-shaped conductor members 40 and 42 are suitably positioned and maintained in a spaced relationship so that slots 44 and 46 are defined by the conductor sheet members. Conductors 40 and 42 are continuous and are nonferromagnetic, e.g., aluminum channels structually backed with concrete.

In accordance with the principles of the invention as described, the coil 32, and thus the vehicle platform 30, is levitated and guided by the developed lift force and restoring or guide forces, respectively, that maintain the moving vehicle platform in substantially constant equilibrium as the vehicle platform is propelled; in the illustration of FIG. 5, a conventional rocket vehicle 34.

The inductive energy stored in the superconductor suspension magnet coil 32 is nor dissipated except by alternating currents induced in the coil by oscillation of the vehicle platform 30 in the guided path defined by the channel members 40 and 42. As described, power is dissipated in the channel members and this results in a drag or eddy current brake on the coil 32, and thus on the vehicle platform 30. Drag increases as the stiffness of the suspension is increased, e.g., the channel members reduced in size so that clearances between the coil and channel members are made smaller. With a relatively large or loose suspension, a lift-to-drag ratio of 30 can be obtained. It is noted that eddy current drag is relatively small when compared to the thrust of the vehicle.

It is contemplated that auxiliary wheels (not shown for purposes of clarity) may be necessary for the starting and stopping of a vehicle platform since the moving magnet carried by the vehicle platform must have a predetermined velocity $v$ to induce the necessary eddy currents in the conductor and thereby to develop the needed lift or repulsive force.

Figures 6, 8:
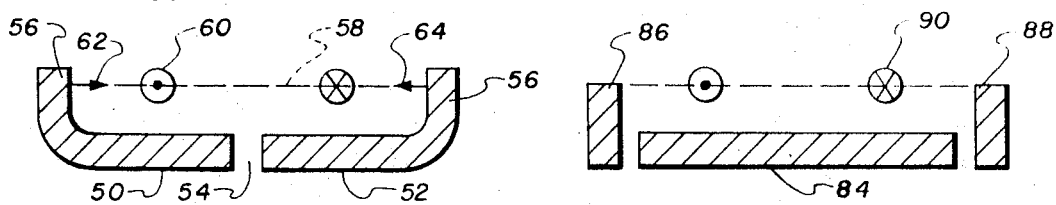
FIG. 6 is a schematic cross section of another form of magnetic suspension system of the invention.
FIG. 8 is a schematic cross section of another form of magnetic suspension system of the invention.

In FIG. 6, another form of conductor means has generally L-shaped nonferromagnetic conductor members 50 and 52 that are spaced apart to define a slot 54. The similar short bars or legs 56 of members 50 and 52 intersect the plane, shown by the dashed line 58, as defined by the magnet coil 60. A repulsive or restoring force indicated by arrows 62 and 64 maintains the coil 60 in equilibrium so that the coil is self-stabilizing during travel. It is contemplated that the short legs 56 of members 50 and 52 could be arranged so that the legs do not intersect the plane.

Figure 7:
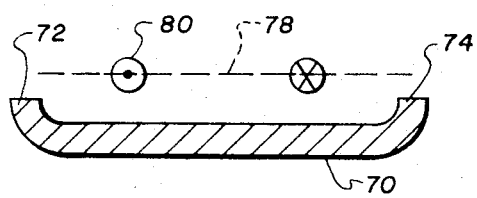
FIG. 7 is a schematic cross section of another form of magnetic suspension system of the invention.

The conductor means in FIG. 7 is a continuous conductor sheet formed from a nonferromagnetic material and having the sheet edges 72 and 74 bent toward the plane 78 defined by the magnet coil 80. The coil 80 is maintained in equilibrium by the resultant forces of repulsion which has as one of its vector components a restoring force that lies generally in the same plane as that defined by the coil 80.

FIG. 8 shows another form of conductor means with a continuous, nonferromagnetic conductor sheet 84 and separate conductor sheets 86 and 88 spaced from and on either side of the conductor sheet 84. The sheets 86 and 88 are arranged substantially perpendicular to the plane defined by the conductor sheet 84. Operatively, a moving coil 90 is maintained in self-stabilizing equilibrium as previously described.

Figure 9:
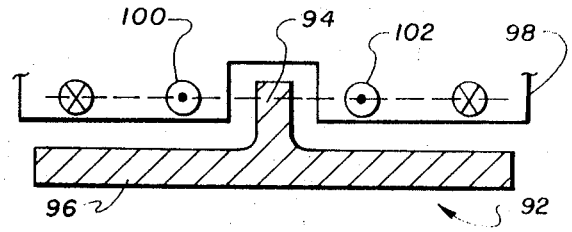
FIG. 9 is a schematic cross section of another form of magnetic suspension system of the invention.

FIG. 9 shows another form of conductor means with a continuous, nonferromagnetic conductor sheet 92 having an outwardly extending ridge 94 that is oriented substantially perpendicular to the plane defined by the base 96 of the conductor sheet. A moving vehicle platform 98 is levitated and guided as previously described by the repulsive forces developed by magnet coils 100 and 102 as they cooperate with the conductor sheet 92 and the ridge 94.

Figure 10:
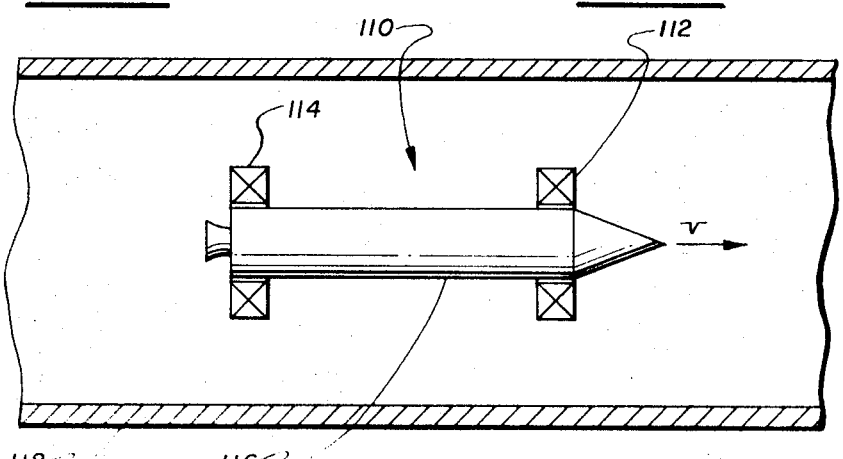
FIG. 10 is a longitudinal section, partly schematic, of another form of vehicle wherein the improved magnetic suspension system of the invention finds use.

Another form of vehicle platform is shown by FIG. 10. Vehicle platform 110 includes magnet coils 112 and 114 positioned about a vehicle 116 which can be a rocket as shown. A longitudinally extending, conductor member 118 in the form of a continuous, nonferromagnetic tube provides the guide channel for the vehicles platform 110.

EXAMPLE

A small rectangular permanent magnet three-quarters inch long, one-quarter inch wide, and one-quarter inch high was retained by a thread and placed about four inches from the center of a nonferromagnetic disc (aluminum) having a diameter of 12 inches and a thickness of one-quarter inch. The disc was rotated at speeds exceeding 2,400 revolutions per minute The magnet began to lift from the disc surface at 1,200 r.p.m. (1,300 centimeters per second or 28.5 miles per hour) and reached maximum lift when the disc was rotating at more than 2,400 r.p.m.

A small rectangular coil was also placed near and parallel to the rotating aluminum disc. The coil was rectangular, 15.1 centimeters × 5.0 centimeters with a square cross section of 0.634×0.634 squared. The coil had 63 turns and an applied current of 8.0 amperes. By means of suitably arranged strain gages, both the lift and drag forces were measured as a function of coil-to-disc distance and disc speed. The effects of air drag and Venturi effect were noticeable but were cancelled by only measuring the change in force when the coil was energized. Selected data from this experiment follows:

| Disc velocity (meters per second) | Lift force (Newton) |
| --- | --- |
| 4 | 0.15 |
| 8 | 0.25 |
| 13 | 0.30 |
| 24 | 0.40 |
| 30 | 0.45 |

As the disc speed is increased, the currents flow closer to the surface and the lift is increased. If it were not for this fact, the force would nearly reach a maximum at much lower speeds. When a superconducting magnet with a persistent current is used instead of the ordinary coil with a constant current supply, the forces measured in the described experiment would be higher when the height of the magnet above the disc is decreased. The amount of flux through a superconducting coil must remain constant. When the coil approaches a surface such as the disc surface, it experiences a decrease in inductance and consequently its current must increase to maintain the flux (LI, where L is inductance and I is current) constant. Since force is proportional to $I^2$, the force is higher than for a constant current coil.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

I claim:

1. An improved magnetic suspension system for a moving vehicle comprising:
    a. magnet means coupled to the moving vehicle and establishing a substantially constant magnetic flux field, and
    b. continuous nonferromagnetic conductor means adjacent said magnet means defining a track for the moving vehicle,
    c. said magnet means operable to induce eddy currents in said continuous conductor means that interact with said magnetic flux field to develop a force which repels such magnet means so that said magnet means and the coupled vehicle are lifted and maintained in a self-stabilizing equilibrium as said magnet means moves along said conductor means.

2. The improved magnetic suspension system of claim 1 in which said magnet means moves at a predetermined relative velocity $v$ so that the induced eddy currents $i$ in said conductor means opposite said magnet means are substantially constant.

3. The improved magnetic suspension system of claim 1 in which said conductor means is a longitudinally extending channel member generally enclosing said magnet means.

4. The improved magnetic suspension system of claim 1 in which said conductor means is a longitudinally extending tube enclosing said magnet means.

5. The improved magnetic suspension system of claim 1 in which said conductor means is a longitudinally extending channel member comprising opposed and spaced-apart L-shaped nonferromagnetic members.

6. The improved magnetic suspension system of claim 1 in which said conductor means includes a longitudinally extending nonferromagnetic sheet and longitudinally extending guidance means positioned substantially perpendicular to the plane defined by said sheet.

7. The improved magnetic suspension system of claim 6 in which said magnet means defines a plane generally parallel with said plane defined by said sheet, said guidance means intersecting the plane defined by said magnet means.

8. The improved magnetic suspension system of claim 6 in which said magnet means defines a plane generally parallel with said plane defined by said sheet, said guidance means terminating before intersecting the plane defined by said magnet means.

9. The improved magnetic suspension system of claim 6 in which said longitudinally extending guidance means is spaced from and along said sheet.

10. The improved magnetic suspension system of claim 6 in which said guidance means is continuous and nonferromagnetic.

11. The improved magnetic suspension system of claim 1 in which said magnet means comprises a superconducting magnet.